US012810275B2

(12) United States Patent
Handshaw

(10) Patent No.: US 12,810,275 B2
(45) Date of Patent: Nov. 24, 2026

(54) SCANNING SESSION MONITOR FOR INDICIA DECODING DEVICES

(71) Applicant: ZEBRA TECHNOLOGIES CORPORATION, Lincolnshire, IL (US)

(72) Inventor: Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 68 days.

(21) Appl. No.: 18/737,096

(22) Filed: Jun. 7, 2024

(65) Prior Publication Data

US 2025/0378430 A1 Dec. 11, 2025

(51) Int. Cl.

| | |
|---|---|
| ***G06Q 20/20*** | (2012.01) |
| ***G06V 40/10*** | (2022.01) |
| ***G06V 40/20*** | (2022.01) |
| ***G07G 1/00*** | (2006.01) |
| ***G07G 1/01*** | (2006.01) |

(52) U.S. Cl.
CPC ......... *G06Q 20/206* (2013.01); *G06Q 20/208* (2013.01); *G06V 40/10* (2022.01); *G06V 40/20* (2022.01); *G07G 1/0072* (2013.01); *G07G 1/01* (2013.01)

(58) Field of Classification Search
CPC .... G06Q 20/206; G06Q 20/208; G06V 40/10; G06V 40/20; G07G 1/0072; G07G 1/01
See application file for complete search history.

(56) References Cited

U.S. PATENT DOCUMENTS

| | | | | |
|---|---|---|---|---|
| 2021/0248879 | A1* | 8/2021 | Khojastepour | G06N 3/0499 |
| 2022/0180343 | A1* | 6/2022 | Takeno | H04N 7/18 |
| 2023/0056327 | A1* | 2/2023 | Brakob | G07G 1/0081 |

* cited by examiner

*Primary Examiner* — Ariel J Yu
*Assistant Examiner* — Denisse Y Ortiz Roman

(57) ABSTRACT

Scanning session monitors for indicia decoding devices are provided herein. An example method includes detecting a start of a scanning session at an indicia decoding device, monitoring an environment of the indicia decoding device during the scanning session, determining that a user or object has left a vicinity of the indicia decoding device, determining that the scanning session is incomplete, and responsive to determining that the scanning session is incomplete, triggering an alert associated with the incomplete scanning session.

21 Claims, 6 Drawing Sheets

SCANNING SESSION MONITOR FOR INDICIA DECODING DEVICES

BACKGROUND

Indicia decoding devices are used in a wide range of applications, many of which involve interactions between an indicia decoding device and members of the general public. As with any system interacting with the general public, such devices often encounter individuals who possess varying degrees of technological proficiency and honesty of intent. These factors can combine to produce situations wherein a first user departs from an indicia decoding device, possibly with one or more scanned objects, without completing the scanning session. This can be exacerbated by situations wherein a second user attempts to initiate a subsequent scanning session without realizing that the first user's scanning session was not ended, which can result in an improper scanning inventory upon completion of the subsequent scanning session.

SUMMARY

Systems, methods, and apparatuses are provided herein for detecting and mitigating incomplete scanning sessions in indicia decoding devices. In an example embodiment, the present invention is a method comprising detecting a start of a scanning session at an indicia decoding device, monitoring an environment of the indicia decoding device during the scanning session, determining that a user or object has left a vicinity of the indicia decoding device, determining that the scanning session is incomplete, and responsive to determining that the scanning session is incomplete, triggering an alert associated with the incomplete scanning session.

In a variation of this example embodiment, the determining that the scanning session is incomplete includes waiting a predetermined time for a printer to send a signal indicative of a completion event and determining that the scanning session is complete responsive to receiving the signal indicative of the completion event.

In a variation of this example embodiment, the determining that the scanning session is incomplete includes tracking user actions to determine whether a completion motion or sequence of motions has taken place and determining that the scanning session is complete responsive to detecting the completion motion or sequence of motions.

In a variation of this example embodiment, the determining that the scanning session is incomplete includes monitoring a user terminal associated with the indicia decoding device.

In a variation of this example embodiment, the monitoring includes employing camera-based machine vision to identify a user in the vicinity of the indicia decoding device.

In a variation of this example embodiment, the monitoring includes employing a weight-sensitive apparatus to identify that a user is adjacent to the indicia decoding device.

In a variation of this example embodiment, the monitoring includes employing a weight-sensitive apparatus to identify that one or more items are in a bagging area associated with the indicia decoding device.

In a variation of this example embodiment, the monitoring includes employing RFID, radar, lidar, or sonar to produce model of the environment of the indicia decoding device.

In a variation of this example embodiment, the method further comprises waiting a predetermined period of time after the determination that the payment event is incomplete before performing the triggering.

In a variation of this example embodiment, the method further comprises temporarily locking the indicia decoding device in an inoperable state, responsive to the alert.

In a variation of this example embodiment, the method further comprises resetting the indicia decoding device in an inoperable state, responsive to the alert.

In another example embodiment, the present invention is a system comprising an indicia decoding device, a memory, and a processing device configured to detect a start of a scanning session at the indicia decoding device, monitor an environment of the indicia decoding device during the scanning session, determine that a user or object has left a vicinity of the indicia decoding device, determine that the scanning session is incomplete, and responsive to determining that the scanning session is incomplete, trigger an alert associated with the incomplete scanning session.

In a variation of this example embodiment, the system further comprises a printer, and the determining that the scanning session is incomplete includes waiting a predetermined time for the printer to send a signal indicative of a completion event and determining that the scanning session is complete responsive to receiving the signal indicative of the completion event.

In a variation of this example embodiment, the determining that the scanning session is incomplete includes tracking user actions to determine whether a completion motion or sequence of motions has taken place and disarming the alert responsive to detecting the completion motion or sequence of motions.

In a variation of this example embodiment, the system further comprises a user terminal, and determining that the scanning session is incomplete includes monitoring the user terminal.

In a variation of this example embodiment, the system further comprises at least one camera, and the monitoring includes employing camera-based machine vision to identify a user in the vicinity of the indicia decoding device.

In a variation of this example embodiment, the system further comprises at least one weight-sensitive apparatus, and the monitoring includes employing the weight-sensitive apparatus to identify that a user is adjacent to the indicia decoding device.

In a variation of this example embodiment, the system further comprises at least one of a radar, lidar, or sonar array, and the monitoring includes employing radar, lidar, or sonar to produce a three-dimensional model of the environment of the indicia decoding device.

In a variation of this example embodiment, the processing device is further configured to wait a predetermined period of time after the determination that the scanning session is incomplete before performing the triggering.

In a variation of this example embodiment, the processing device is further configured to temporarily lock the indicia decoding device in an inoperable state, responsive to the alert.

In yet another example embodiment, the present invention is a non-transitory, computer-readable memory containing instructions which, when executed by a processing device, cause the processing device to detect a start of a scanning session at the indicia decoding device, monitor an environment of the indicia decoding device during the scanning session, determine that a user or object has left a vicinity of the indicia decoding device, determine that the scanning session is incomplete, and responsive to determining that the scanning session is incomplete, trigger an alert associated with the incomplete scanning session.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
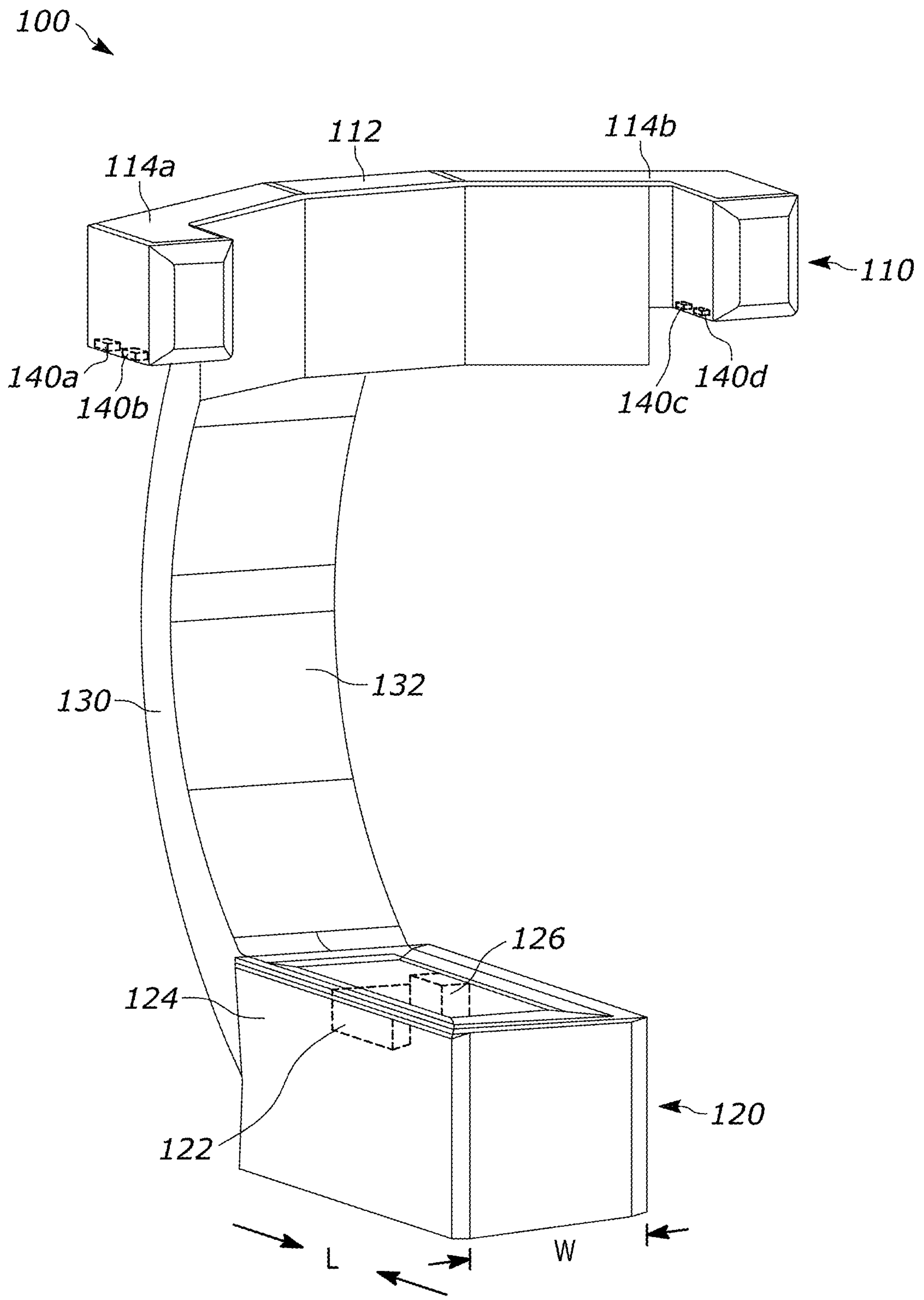
FIG. 1 illustrates an example system for detecting and mitigating incomplete scanning sessions, according to example embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Systems, methods, and apparatuses are provided herein for detecting and mitigating incomplete scanning sessions in indicia decoding devices. Indicia decoding devices are often placed in settings where not all users will be technically proficient or of pure intent. Often, users of an indicia decoding device will depart a vicinity of the indicia decoding device thinking that a scanning session has been completed when in fact it has not been completed. One of the advantages of automated indicia decoding device terminals such as those found in a self-checkout area of a grocery store is a reduction in the need for human attention for each user as compared to a traditional checkout line, but such a reduction in human attention can introduce more opportunities for errors and abuses of the automated indicia decoding devices, such as intentionally departing with one or more items before completing a scanning session. It is therefore desirable to create a system which is able to detect a user departing an indicia decoding device before completing a scanning session, then take action to mitigate the incomplete scanning session.

Systems, methods, and apparatuses of the present disclosure advantageously monitor scanning sessions of indicia decoding devices to detect and mitigate situations in which a user has departed during an incomplete scanning session by monitoring an area around the indicia decoding device, then take action responsive to a detected departure while the scanning session is incomplete. By employing one or more monitoring methods such as but not limited to radar (radio-based ranging systems), lidar (light-based ranging systems, including infrared), optical cameras, sonar (sound-based ranging systems, including ultrasound), pressure sensitive apparatuses, beam presence detection, or any other means of monitoring an environment of the indicia decoding device, a user's presence can be reliably detected and monitored. By alerting a human and locking or resetting the indicia decoding device when a user's departure occurs during an incomplete scanning session, a departure event can be mitigated.

It will be appreciated by those of skill in the art that such techniques have the potential to result in "false alarm" alerts when atypical behavior arises that does not constitute a departure during a scanning session. The present disclosure therefore also contemplates several measures for reducing an incidence of false alerting, such as waiting a predetermined amount of time after a departure is detected before taking a mitigating action.

FIG. 1 illustrates an example system 100 for detecting and mitigating incomplete scanning sessions, according to example embodiments of the present disclosure. The example system 100 includes an upper assembly 110 and a lower assembly 120 connected by a support member 130. The lower assembly 120 contains an indicia decoding device 122 in a lower housing 124. The indicia decoding device 122 may be configured to view one or more objects in a scanning area through a transparent surface 126 of the lower assembly 120. The support member 130 may be enclosed by a support housing 132 and the upper assembly 110 may likewise be enclosed by an upper housing 112. In this example embodiment, the upper assembly 110 includes a first arm 114*a* and a second arm 114*b* (collectively, the arms 114) extending to either side of the support member 130 on an axis substantially perpendicular to a typical viewing angle of a user.

The arms 114 may be employed to mount displays facing the user, and in this example the arms 114 also mount a first camera 140*a*, a second camera 140*b*, a third camera 140*c*, and a fourth camera 140*d* (collectively, the cameras 140). It will be appreciated that while the present example is illustrated with four cameras 140 mounted on a lower surface of the arms 114, any number of cameras 140, microphones, light emitters, sound emitters, sensors, and/or other devices which might be used to observe a surrounding environment may be included in various embodiments of the present disclosure. Moreover, it will also be appreciated that the cameras 140, microphones, light emitters, sound emitters, sensors, and/or other devices which might be used to observe a surrounding environment may be mounted to or included in embodiments of the present disclosure in any conceivable configuration, and that the particular positioning of the cameras 140 as illustrated herein is not intended to be limiting in any way.

In an example usage scenario of the example system 100 as a self-checkout kiosk, a user might walk up to the example system 100 and begin scanning items across the transparent surface 126 for identification by the indicia decoding device 122. After scanning several items, the user might attempt to complete the scanning session by inserting a credit card into a terminal associated with the system 100. Thinking that the scanning session has been completed, the user might then collect the scanned items and walk away from the indicia decoding device 122. The cameras 140 may detect the user walking away, initiating a check for completion of the scanning session. The system 100 may determine that the scanning session was not properly completed (e.g. the credit card was declined) and send an alert to an attendant to intervene. The system 100 may also lock the indicia decoding device 122 to prevent additional items from being scanned and/or reset the indicia decoding device 122 to prepare for a next user.

Figure 2:
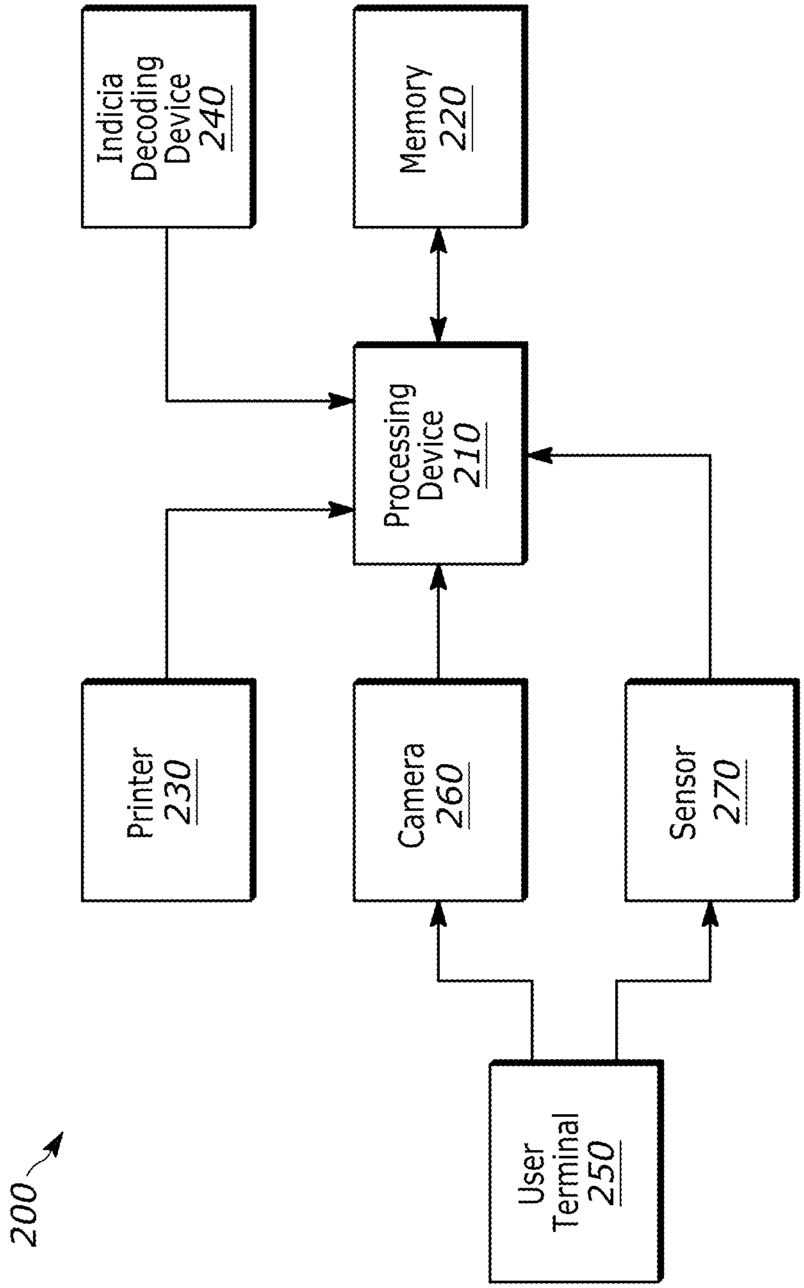
FIG. 2 illustrates an example monitoring dataflow, according to example embodiments of the present disclosure.

FIG. 2 illustrates an example monitoring dataflow 200, according to example embodiments of the present disclosure. In this example dataflow, a processing device 210 receives data from a variety of sources. An indicia decoding device 240 may send information about items which a user is passing through a scanning region. This information may include decoded payload data from indicia affixed to or displayed on the items such as but not limited to 1D barcodes, 2D barcodes, alphanumeric characters, colors, patterns, or other markings.

A user terminal 250 with which the user interacts may be monitored by at least one sensor 270 configured to detect a presence of the user. The at least one sensor 270 may include a radar array, a lidar array, an optical beam sensor, a sonar array, a weight-sensitive apparatus, a camera 260, or any other device which may be employed to detect the presence of the user. In this example, a camera 260 monitors an environment of the user terminal 250 to detect and monitor the presence of the user. The camera 260 and the sensor(s) 270 may each send output data to the processing device 210 for analysis.

A printer 230 may also be included, and may send notifications to the processing device 210 when an action has been completed, such as printing a document. The printer 230 may also be configured to send error messages to the processing device 210 in scenarios where, for example, a supply of paper for printing has been exhausted. The processing device 210 may be operatively coupled to a memory 220 such that data for performing operations of the processing device 210 and outputs of those operations may be retained in the memory 220. The memory 220 may be volatile, such as but not limited to random access memory (RAM) or non-volatile, such as but not limited to flash storage.

Figure 3:
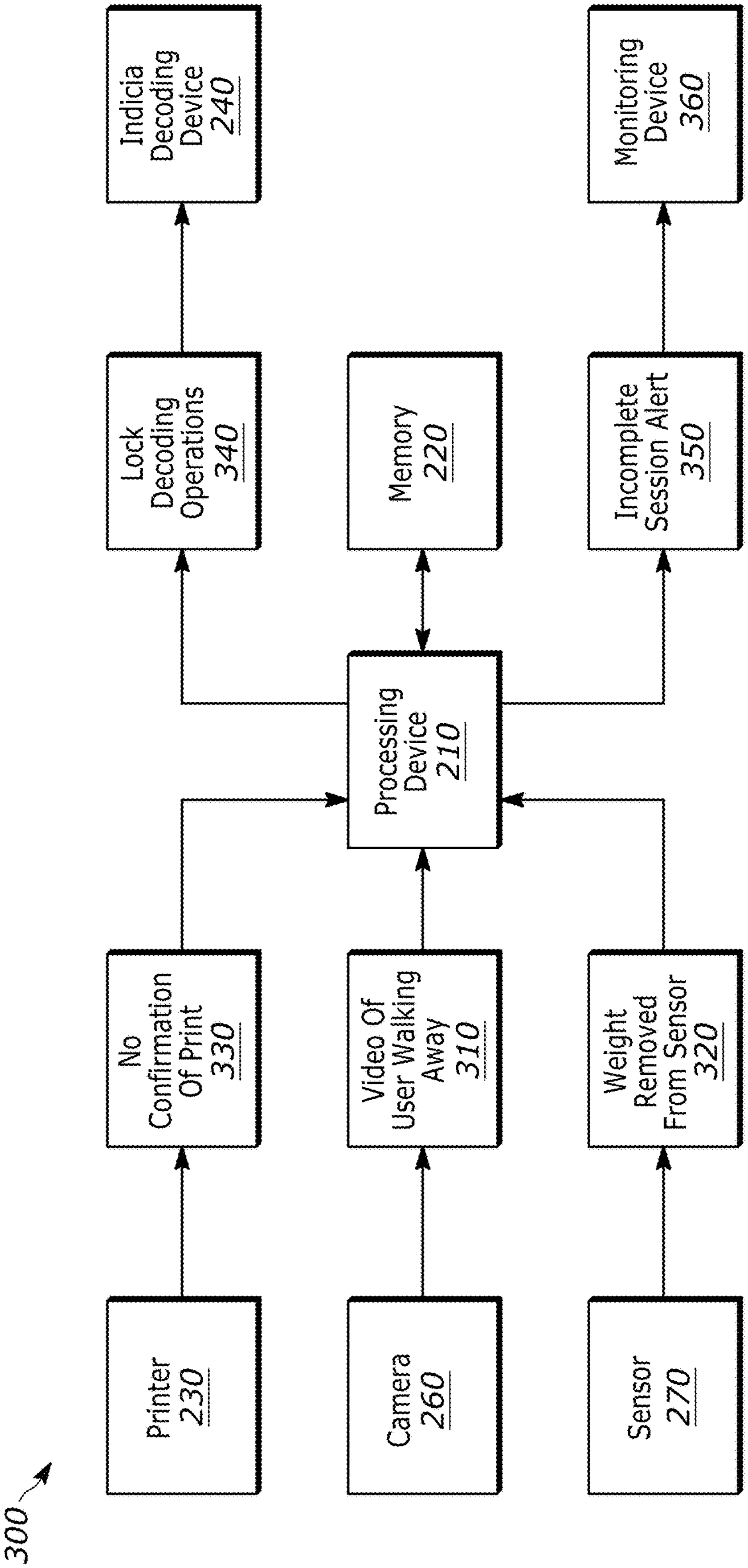
FIG. 3 illustrates an example alert dataflow, according to example embodiments of the present disclosure.

FIG. 3 illustrates an example alert dataflow 300, according to example embodiments of the present disclosure. In this example, a user has just walked away from a system such as the system 100 (see FIG. 1) executing a dataflow 300 similar to that of FIG. 2. The processing device 210 may receive video data 310 from a camera 260 representative of a video of the user walking away. Separately, the processing device 210 may receive weight data 320 from a weight sensor 270 indicative of a weight being removed from the sensor 270 (e.g. items being removed from a bagging area or the user walking off of a pressure pad). The processing device 210 may then wait for a confirmation of print from a printer 230 which prints receipts associated with an indicia decoding device 240. In some embodiments, the processing device 210 may poll the printer 230 periodically to request a print confirmation. In some embodiments, polling for or detection of a print confirmation may operate continuously, while and after the user is present at the indicia decoding device 240, or during a predetermined window of time when a completion event is likely to occur.

The printer 230 may fail to send a print conformation or send a message indicative of no print 330. In this example scenario, the processing device 210 may proceed immediately to perform mitigating tasks or may wait a predefined amount of time before undertaking mitigating tasks. In scenarios where the processing device 210 waits a predefined amount of time, the processing device 210 may be configured to poll the printer 230 periodically for an updated status of print confirmation or wait for the printer 230 to send a print confirmation message. If a print confirmation message has not been received by the processing device 210 by an end of the predefined amount of time, the processing device 210 may proceed to perform mitigating tasks. In some example scenarios, the printer 230 may send a message to the processing device 210 indicative of a printing error. In these scenarios, the processing device 210 may behave, for the purposes of determining scanning session completion, as if a print confirmation was received and determine that the scanning session was completed. It will be appreciated that though the processing device 210 may behave as if a print confirmation was received for the purpose of determining scanning session completion, the processing device 210 may take other actions related to an error message which lie outside a scope of determining scanning session completion, such as sending an alert to a human supervisor or attendant indicative of the printing error.

Returning to the scenario where the processing device 210 does not receive conformation of a print from the printer 230, the processing device 210 may proceed to perform mitigating tasks. In this example scenario, mitigating tasks may include but are not limited to sending a signal to the indicia decoding device 240 to lock decoding operations 340. This may prevent a subsequent user from approaching the indicia decoding device 240 and attempting to initiate a new scanning session while items from the previous scanning session are still present in a scanning inventory. In some scenarios, the processing device 210 may instead reset the indicia decoding device 240 to prepare for a new scanning session, allowing a subsequent user to begin a new scanning session as if the previous user had completed the previous scanning session. In some example scenarios, the processing device 210 may be configured to first lock decoding operations 340, then wait for a predefined period of time to elapse (which may be different from the predefined amount of time discussed in relation to determining scanning session completion) before resetting the indicia decoding device 240. In yet another example scenario, the processing device 210 may be configured to wait for a signal from an exterior system (e.g. a terminal of a supervising human) before resetting the indicia decoding device 240.

Another mitigating task that the processing device 210 may perform is sending an incomplete session alert 350 to a monitoring device 360. The monitoring device may be but is not limited to a terminal associated with a human supervisor or attendant. The incomplete session alert may be sent via any means of communication, including but not limited to electrical signals, radio signals, optical signals, physical linkages, or punch cards. In some embodiments, the monitoring device may be an analog signalling system associated with the indicia decoding device 240, such as but not limited to a light above a user terminal, a semaphore, an audio alarm, or any other alerting means.

Figure 4:
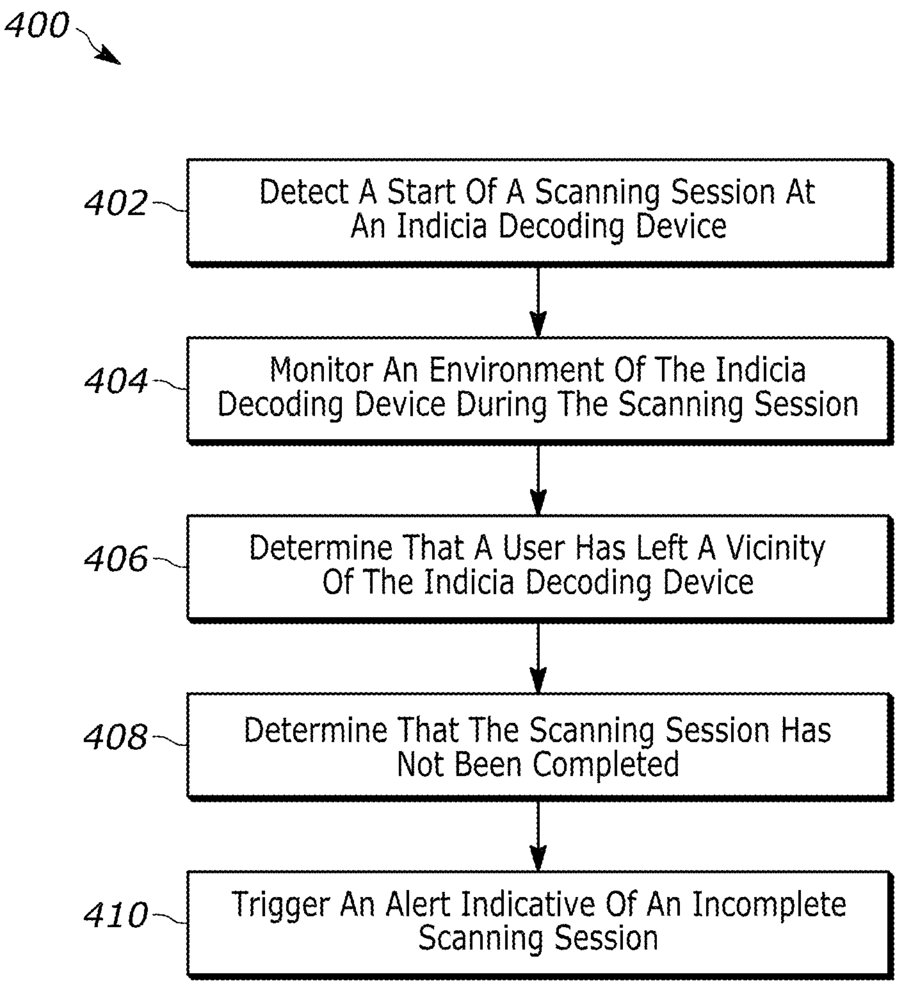
FIG. 4 illustrates a flowchart of an example method for detecting and mitigating incomplete scanning sessions, according to example embodiments of the present disclosure.

FIG. 4 illustrates a flowchart of an example method 400 for detecting and mitigating incomplete scanning sessions, according to example embodiments of the present disclosure. It will be appreciated that the method 400 is presented at a high level for clarity and conciseness, and that additional steps not explicitly mentioned or contemplated herein may be included in the method 400. It will also be appreciated that some steps of the method 400 may not be completed in part or in whole by some embodiments of the present disclosure.

The example method 400 begins at block 402, where an example processing device detects a start of a scanning session at an indicia decoding device. For example, a processor 210 for a self-checkout kiosk might receive a signal from an indicia decoding device 122 when a user scans a first item. In some example scenarios, the processor 210 may poll the indicia decoding device 122 to determine whether a scanning session has started.

At block 404, one or more example cameras and/or sensors monitors an environment of the indicia decoding device during the scanning session. For example, an array of cameras 140 might collect video data of the user while a lidar array collects 3D spatial data and a weight sensor 270 monitors a floor area around the indicia decoding device 122.

At block 406, the example processing device determines that a user has left a vicinity of the indicia decoding device. For example, the lidar array may send data to the processor 210 showing that a previously occupied space in front of the kiosk is no longer occupied while the camera array 140 might send video data 310 to the processor 210 showing the user walking away from the kiosk and the weight sensor 270 shows a sudden decrease in weight resting on the sensor 270. The processor 210 may combine this data via rules-based or machine learning techniques to determine that the user has left a vicinity of the kiosk.

At block 408, the example processing device may determine that the scanning session has not been completed. For example, a camera 140 might monitor a display of a user interface to determine that a completion event (such as a payment) has not occurred. This may involve detecting that a certain screen of the user interface is still being displayed, decoding information displayed by the user interface, tracking actions of the user when interacting with the user interface, other monitoring actions monitoring the user interface, or combinations thereof. In some embodiments, the processing device 210 may monitor for signals from a transaction processing device indicative of a completion event. It will be appreciated that many means of detecting completion events are feasible, and that any may be functionally substituted with varying degrees of reliability and vulnerability to malicious circumvention but that in some embodiments certain means which are more vulnerable to malicious action may be more technically feasible to implement, such as when communications from a transaction processing device are not available.

At block 410, the example processing device triggers an alert indicative of an incomplete scanning session. For example, the processor 210 may send an electronic signal through a cable connected to a network switch which routes the signal to an attendant terminal. This electronic signal may comprise an alert 350 which causes the attendant terminal to direct a human attendant or supervisor to intervene to mitigate the incomplete scanning session.

Figure 5:
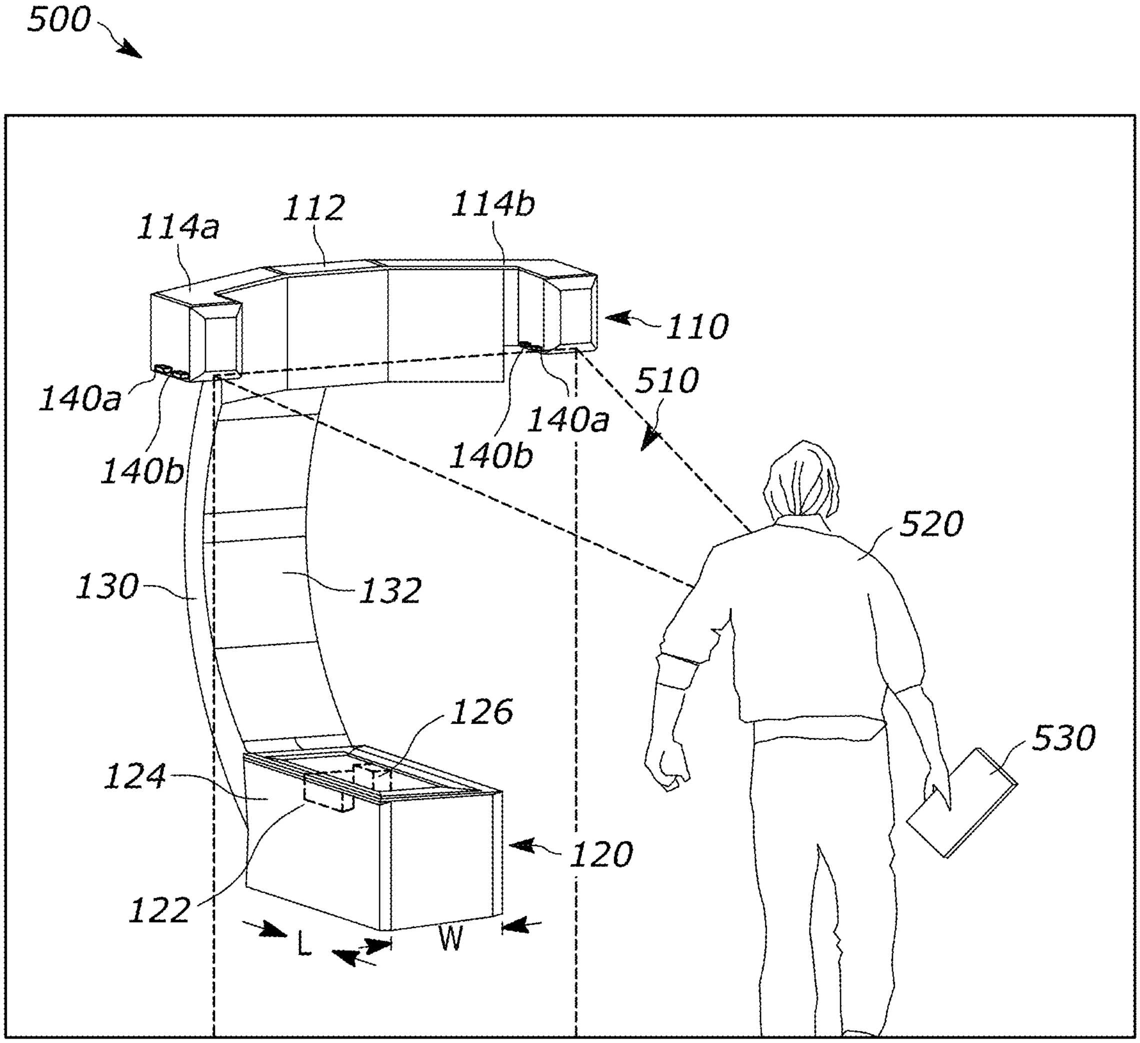
FIG. 5 illustrates an example system detecting an incomplete scanning session with one or more cameras, according to example embodiments of the present disclosure.

FIG. 5 illustrates an example system 500 detecting an incomplete scanning session with one or more cameras 140, according to example embodiments of the present disclosure. In this example, the system 500 includes an array of four cameras 140 configured to monitor a field of view 510. A user 520 may approach the system 500 and scan an object 530, then proceed to depart the field of view 510 without completing a scanning session by purchasing the object 530, which may, for example, be a gift card. The system 500 may collect video data from the camera array 140 and determine that the user 520 has departed without completing the scanning session. This may be achieved by rules-based means such as detecting motion in the video data to indicate that the user 520 is still present. In parallel or alternatively, machine learning techniques may be employed to detect and monitor the user 520. For example, the system 500 may be configured to identify individuals and objects in the video data, segment those individuals and objects into separate streams of video data, then identify the objects to determine what actions (if any) the user 520 is performing.

In some example embodiments, the system 500 may track movements of the user 520 within the field of view 510. The system 500 may determine that a scanning session is complete when the user 520 performs a series of motions associated with completion of the scanning session, such as inserting and removing a card from a transaction processing device. This motion tracking may also allow the system 500 to identify whether a user 520 has taken an item 530, allowing the system 500 to forego mitigating tasks if the user 520 has taken nothing or to trigger a different alert indicative of an abandoned scanning session.

Machine learning techniques contemplated herein may use any combination of supervised, unsupervised, or semi-supervised learning techniques. Although any data may be used in the training of machine learning models used by some example embodiments of the present disclosure, training setw which contain historical data from sensor and camera arrays associated with a particular setting of an example embodiment of the present disclosure may yield machine learning models of greater utility than those which lack such data. Furthermore, systems, methods, and apparatuses of the present disclosure may continuously train machine learning models employed therein with data collected during operation, thereby enabling performance improvements in-situ as a system, method, or apparatus is used.

Figure 6:
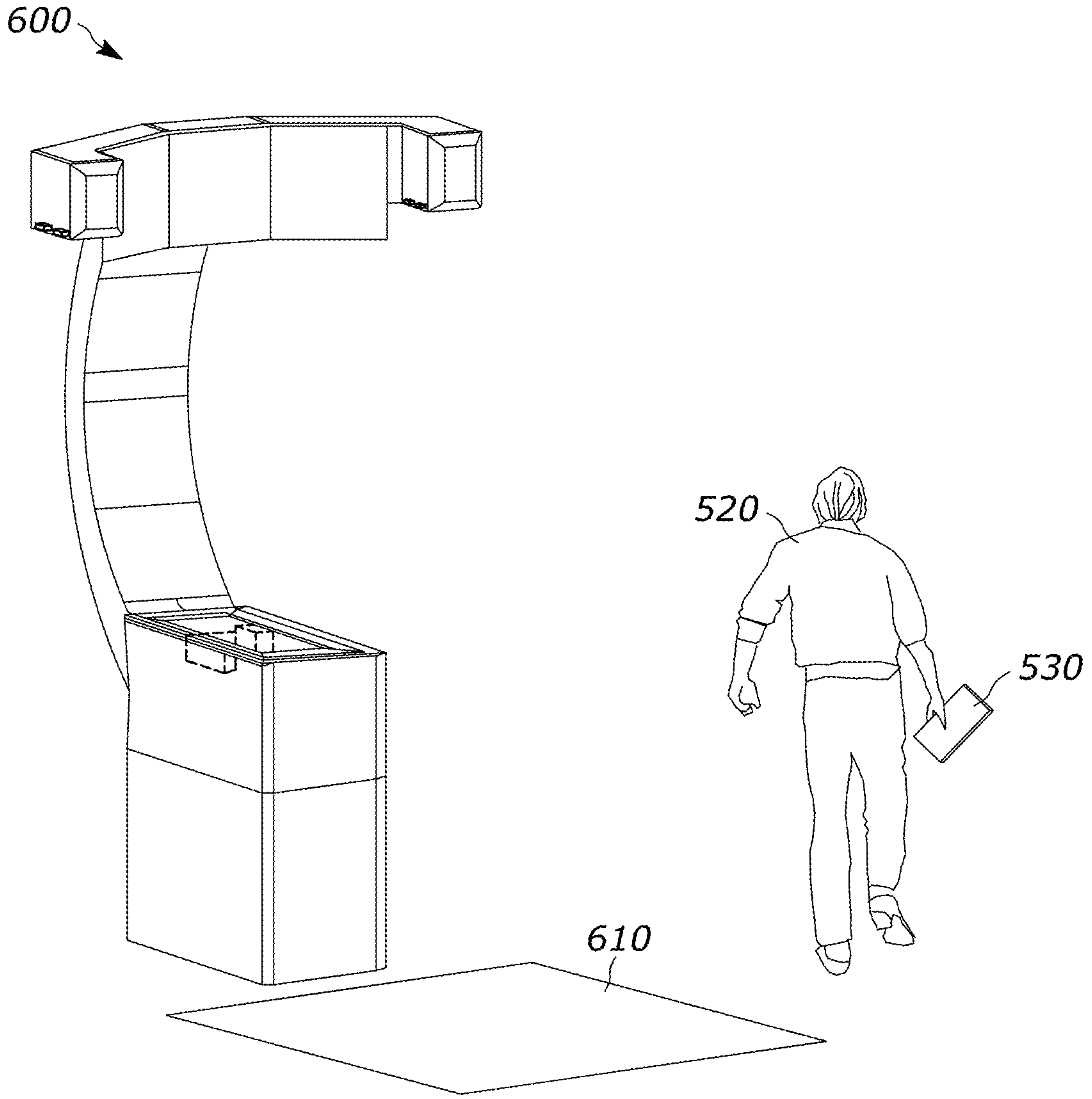
FIG. 6 illustrates an example system detecting an incomplete scanning session with a weight-sensitive apparatus, according to example embodiments of the present disclosure.

FIG. 6 illustrates an example system 600 detecting an incomplete scanning session with a weight-sensitive apparatus 610, according to example embodiments of the present disclosure. In some example embodiments, a resource cost of capturing and processing data from a camera array, a lidar array, a sonar array, or other complex sensor arrays may be prohibitive. This example illustrates a potential alternative which may be used in lieu of or in tandem with those more sophisticated sensing means. A weight-sensitive apparatus 610, such as but not limited to a scale or pressure-sensitive mat, may occupy a floor space in front of or around a self-checkout kiosk. The weight sensitive apparatus 610 may be positioned such that when a user 520 initiates a scanning session, the user 520 is likely or certain to be standing on the weight sensitive apparatus 610. The system 600 may then monitor data from the weight sensitive apparatus 610 to determine if the user 520 is still present. When a weight resting on the pressure-sensitive apparatus changes such that it is likely that the user 520 has left, the system 600 may initiate mitigation tasks.

It will be appreciated that while the weight sensitive apparatus 610 may be a low-cost and effective tool to detect a failed completion of a scanning session, it may be difficult or impossible to determine based upon data from a weight sensitive apparatus alone whether an user 520 has left with an item 530 or has simply decided to abandon the scanning session without taking the item 530. Some embodiments of the present disclosure may forego mitigating tasks if all scanned items are still in the vicinity of the system 600 when the user 520 leaves, and such configurations are likely to require additional sensing apparatuses which may be used in tandem with the weight sensitive apparatus 610 or independently. It will also be appreciated that the weight sensitive apparatus 610 may be vulnerable to malicious behavior like, for example, using a shopping cart to replace the user's 520 weight as the user departs. It is therefore likely (but not required) that the weight sensitive apparatus 610 illustrated herein would accompany other sensing apparatuses such as but not limited to a radar array, a lidar array, a camera array, a sonar array, or other sensing apparatuses.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed:

1. A method, comprising:

detecting a start of a scanning session at an indicia decoding device;

monitoring an environment of the indicia decoding device during the scanning session by combining image data from at least one camera with sensor data to generate a model of the environment surrounding the indicia decoding device;

determining that a user or object has left a vicinity of the indicia decoding device;

determining that the scanning session is incomplete by monitoring a user terminal associated with the indicia decoding device to determine that a completion event has not occurred; and responsive to determining that the scanning session is incomplete, triggering an alert associated with the incomplete scanning session after waiting a predetermined period of time and temporarily locking the indicia decoding device in an inoperable state.

2. The method of claim 1, wherein the determining that the scanning session is incomplete includes waiting a predetermined time for a printer to send a signal indicative of a completion event and determining that the scanning session is complete responsive to receiving the signal indicative of the completion event.

3. The method of claim 1, wherein the determining that the scanning session is incomplete includes tracking user actions to determine whether a completion motion or sequence of motions has taken place and determining that the scanning session is complete responsive to detecting the completion motion or sequence of motions.

4. The method of claim 1, wherein the determining that the scanning session is incomplete includes monitoring a user terminal associated with the indicia decoding device.

5. The method of claim 1, wherein the monitoring includes employing camera-based machine vision to identify a user in the vicinity of the indicia decoding device.

6. The method of claim 1, wherein the monitoring includes employing a weight-sensitive apparatus to identify that a user is adjacent to the indicia decoding device.

7. The method of claim 1, wherein the monitoring includes employing a weight-sensitive apparatus to identify that one or more items are in a bagging area associated with the indicia decoding device.

8. The method of claim 1, wherein the monitoring includes employing RFID, radar, lidar, or sonar to produce model of the environment of the indicia decoding device.

9. The method of claim 1, further comprising waiting a predetermined period of time after the determination that the payment event is incomplete before performing the triggering.

10. The method of claim 1, further comprising temporarily locking the indicia decoding device in an inoperable state, responsive to the alert.

11. The method of claim 1, further comprising resetting the indicia decoding device in an inoperable state, responsive to the alert.

12. A system, comprising:

an indicia decoding device;

a memory; and a processing device, configured to:

detect a start of a scanning session at the indicia decoding device;

monitor an environment of the indicia decoding device during the scanning session by combining image data from at least one camera with sensor data to generate a model of the environment surrounding the indicia decoding device;

determine that a user or object has left a vicinity of the indicia decoding device;

determine that the scanning session is incomplete by monitoring a user terminal associated with the indicia decoding device to determine that a completion event has not occurred; and responsive to determining that the scanning session is incomplete, trigger an alert associated with the incomplete scanning session after waiting a predetermined period of time and temporarily lock the indicia decoding device in an inoperable state.

13. The system of claim 12, further comprising a printer, and wherein the determining that the scanning session is incomplete includes waiting a predetermined time for the printer to send a signal indicative of a completion event and determining that the scanning session is complete responsive to receiving the signal indicative of the completion event.

14. The system of claim 12, wherein the determining that the scanning session is incomplete includes tracking user actions to determine whether a completion motion or sequence of motions has taken place and disarming the alert responsive to detecting the completion motion or sequence of motions.

15. The system of claim 12, further comprising a user terminal, wherein the determining that the scanning session is incomplete includes monitoring the user terminal.

16. The system of claim 12, further comprising at least one camera, wherein the monitoring includes employing camera-based machine vision to identify a user in the vicinity of the indicia decoding device.

17. The system of claim 12, further comprising at least one weight-sensitive apparatus, wherein the monitoring includes employing the weight-sensitive apparatus to identify that a user is adjacent to the indicia decoding device.

18. The system of claim 12, further comprising at least one of a radar, lidar, or sonar array, wherein the monitoring includes employing radar, lidar, or sonar to produce a three-dimensional model of the environment of the indicia decoding device.

19. The system of claim 12, wherein the processing device is further configured to wait a predetermined period of time after the determination that the scanning session is incomplete before performing the triggering.

20. The system of claim 12, wherein the processing device is further configured to temporarily lock the indicia decoding device in an inoperable state, responsive to the alert.

21. A non-transitory, computer-readable memory containing instructions which, when executed by a processing device, cause the processing device to:

detect a start of a scanning session at the indicia decoding device;

monitor an environment of the indicia decoding device during the scanning session by combining image data from at least one camera with sensor data to generate a model of the environment surrounding the indicia decoding device;

determine that a user or object has left a vicinity of the indicia decoding device;

determine that the scanning session is incomplete by monitoring a user terminal associated with the indicia decoding device to determine that a completion event has not occurred; and responsive to determining that the scanning session is incomplete, trigger an alert associated with the incomplete scanning session after waiting a predetermined period of time and temporarily locking the indicia decoding device in an inoperable state.

* * * * *